Figure 1:
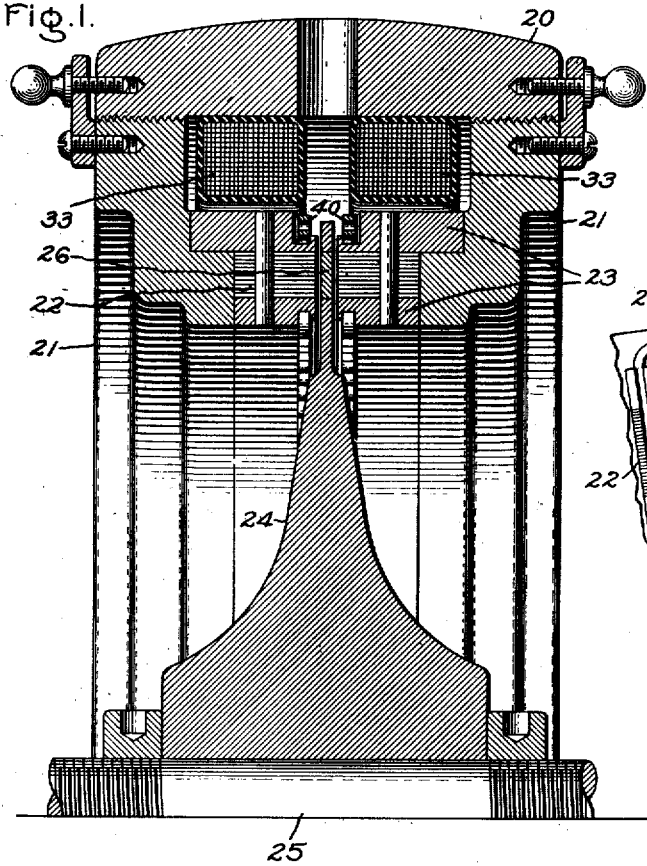

E. F. W. ALEXANDERSON.
SYSTEM OF ELECTRICAL DISTRIBUTION.
APPLICATION FILED JUNE 22, 1915.

1,242,632.

Patented Oct. 9, 1917.
3 SHEETS—SHEET 1.

Inventor:
Ernst F. W. Alexanderson,
by
His Attorney

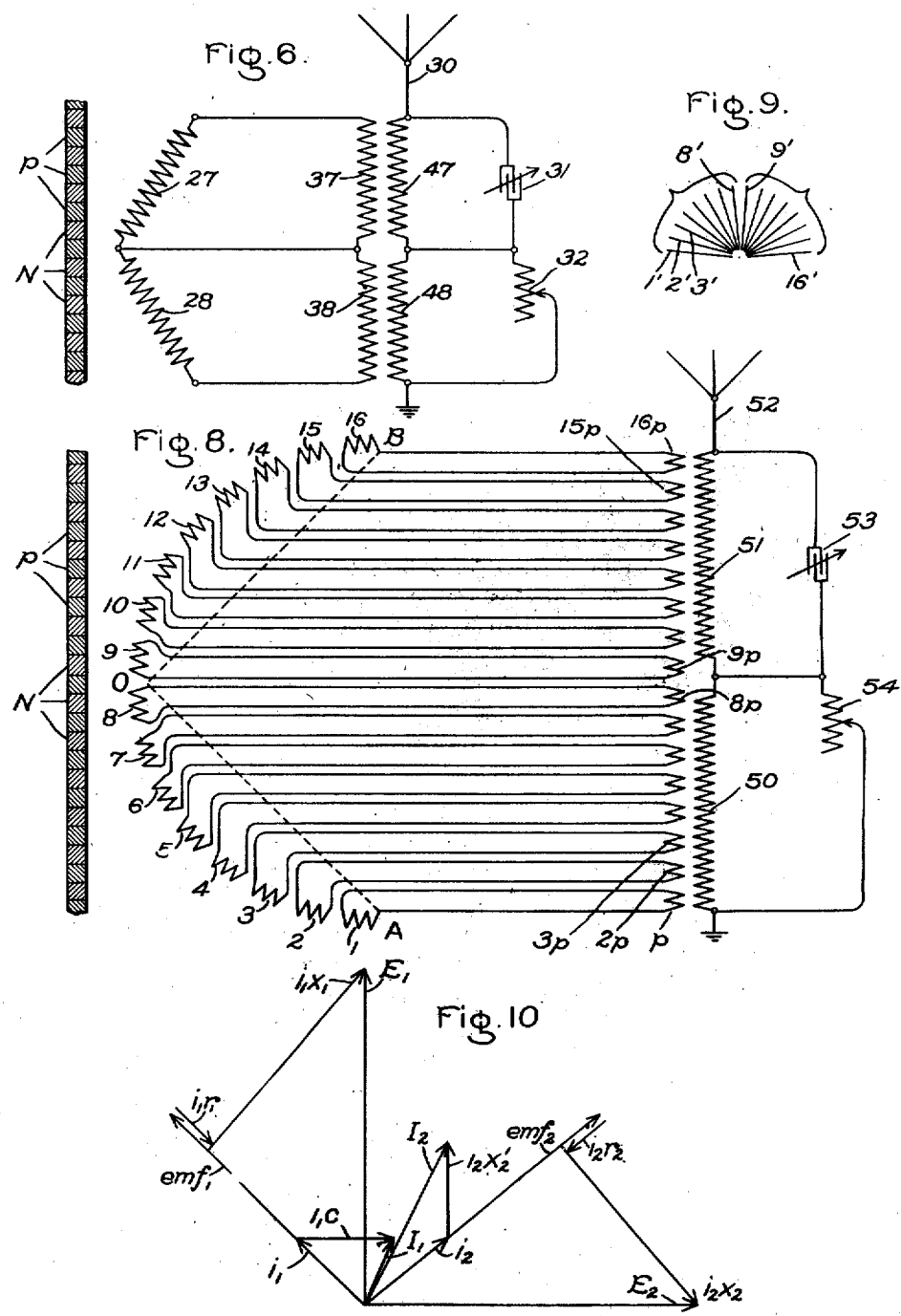

E. F. W. ALEXANDERSON.
SYSTEM OF ELECTRICAL DISTRIBUTION.
APPLICATION FILED JUNE 22, 1915.

1,242,632.

Patented Oct. 9, 1917.
3 SHEETS—SHEET 3.

Inventor:
Ernst F. W. Alexanderson,
by
His Attorney.

United States Patent Office.

ERNST F. W. ALEXANDERSON, OF SCHENECTADY, NEW YORK, ASSIGNOR TO GENERAL ELECTRIC COMPANY, A CORPORATION OF NEW YORK.

SYSTEM OF ELECTRICAL DISTRIBUTION.

1,242,632.   Specification of Letters Patent.   Patented Oct. 9, 1917.

Application filed June 22, 1915. Serial No. 35,712.

*To all whom it may concern:*

Be it known that I, ERNST F. W. ALEXANDERSON, a citizen of the United States, residing at Schenectady, county of Schenectady, State of New York, have invented certain new and useful Improvements in Systems of Electrical Distribution, of which the following is a specification.

My invention relates to systems of electrical distribution, and especially to systems including a high frequency alternator as the source of electric energy. My invention more particularly relates to systems of radio communication and still more specifically to continuous wave systems in which a high frequency alternator is employed as the source of alternating current energy of radio frequency.

One object of my invention is to provide in a system of electrical distribution a novel and improved arrangement of apparatus for supplying to a load circuit a single phase flow of alternating current power which is substantially the sum of the power generated in the different phase circuits of a polyphase high frequency alternator. As applied to a system of radio communication, the object of my invention in this connection is to provide a novel and improved arrangement of apparatus for supplying from a polyphase high frequency alternator to an antenna a single phase flow of power which is substantially the sum of the power generated in the different phases of the alternator.

Another object of my invention is to provide an improved arrangement of apparatus for supplying to a load circuit from a high frequency alternator having an armature winding in which alternating voltages differing in time phase are generated, either by accident or by design, a single phase flow of power which is substantially the sum of the power generated in the different phase circuits of the armature winding. A further object of my invention is to provide a novel and improved arrangement of apparatus for operating a high frequency alternator in a system of electrical distribution, such as a system of radio communication, with self-excitation. Other objects of my invention will be noted by those skilled in the art from the following description.

Figure 2:
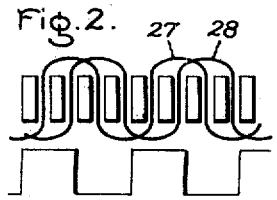
Figure 3:
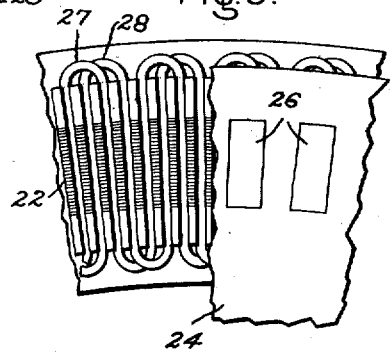
Figure 4:
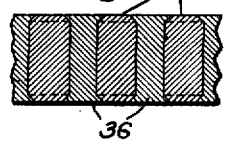
Figure 7:
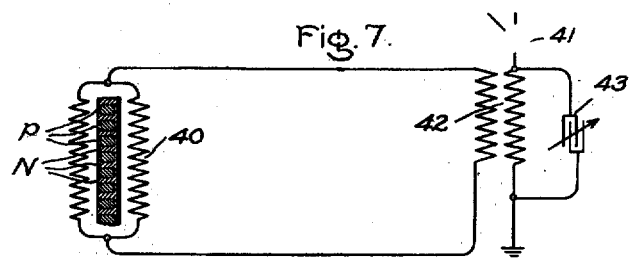
Figure 5:
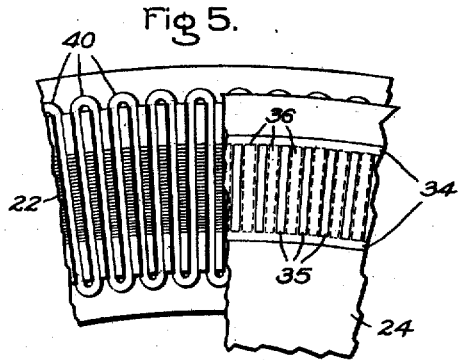

The novel features which I believe to be patentably characteristic of my invention are definitely indicated in the claims appended hereto. The principles of my invention and their embodiment in systems of and apparatus for radio communication will be understood from the following description taken in connection with the accompanying drawings, in which:

Figure 1 is a vertical cross section of the upper half of a high frequency alternator of the type to which certain features of my invention particularly relate, Figs. 2 and 3 are diagrammatic developed views of the stator slots and teeth and the inductor poles of a polyphase alternator of the type shown in Fig. 1; Figs. 4 and 5 are detail views of an improved single phase high frenquency alternator adapted for self-excitation through armature reaction by a leading current; Fig. 7 is a diagrammatic view of a system of radio communication including an alternator of the type represented in Figs. 4 and 5. Figs. 6, 8, 11 and 12 are diagrammatic views of my novel and improved arrangement of apparatus for obtaining from a polyphase high frequency alternator a single phase flow of power which is substantially the sum of the power generated in the different polyphase circuits; and Figs. 9, 10 and 13 are explanatory diagrams.

In my United States Letters Patents No. 1,008,577, Nov. 14, 1911, No. 1,110,029, Sept. 8, 1914, and No. 1,110,030, Sept. 8, 1914, I have described a high frequency alternator of the inductor alternator type having a stationary laminated magnetic core carrying an armature winding for the induced high frequency current and a solid steel rotor made in the shape of a disk designed for maximum strength. This machine is excited by a pair of field coils mounted in the stator. In my United States Letters Patent No. 996,445, June 27th, 1911, I have described the use of a high frequency alternator of the inductor type as a telephone relay. As a telephone relay, the high frequency inductor alternator receives its excitation from the pulsating telephone currents, and, in accordance with the invention of my Patent No. 996,445, a single winding serves at the same time as the exciting and armature windings of the machine. It is well known that a polyphase inductor alternator generating voltages of commercial frequency can be operated as a self-excited machine if a leading current is supplied to its armature winding. Such a leading current is usually produced by over-excited synchronous machines. I have discovered that a high frequency inductor alternator having a polyphase armature winding can produce its own excitation, in whole or in part, by armature reaction when operating with leading armature currents. When dealing with high frequency current, I have found that the leading current for self-excitation is more conveniently produced by condensers.

While generally speaking, it is possible to make any ordinary synchronous machine self-exciting by loading it on a sufficient quantity of condensers, a difficult problem has remained of providing a practical type of self-excited high frequency inductor alternator. The high frequency alternators for radio communication are single phase machines, while the feature of self-excitation necessarily involves a polyphase effect of some kind, because a magnetomotive force must be furnished by the magnetic reactions from the induced currents which will maintain the rotating field continuously. The necessary polyphase effect for self-excitation can be produced either in the stator or in the rotor. In Figs. 2, 3 and 6 of the drawings, I have shown a high frequency inductor alternator adapted to operate as a self-excited machine in which the polyphase effect is produced in the stator by a polyphase winding. In Figs. 4, 5 and 7 of the drawings, I have shown a high frequency alternator adapted for self-excitation in which the polyphase effect is produced in the rotor by a short-circuited winding.

The mechanical construction of the two types of alternators illustrated in Figs. 2 to 7 inclusive may be substantially identical with that shown in my aforementioned patents. Fig. 1 of the drawings, accordingly, serves to illustrate the general construction of the high frequency alternators of which Figs. 2, 3, 4 and 5 are detail views. The stator frame 20 of the alternator has mounted therein a pair of ring-shaped members 21—21. Each of these members carries a circumferentially laminated ring 22 of magnetic material clamped between two rings 23. The laminated rings 22 have opposite faces lying in adjacent radial planes, and each of these adjacent opposite faces are slotted for the accommodation of the armature winding or windings. Between the laminated rings 22 extends the periphery of the inductor or rotor 24 which is in the form of a solid steel disk secured to a rotatably mounted shaft 25.

The inductor is slotted near its periphery so as to form magnetic poles. In order to avoid excessive windage at the high speed at which the inductor is designed to operate, the slots are filled with solid non-magnetic blocks 26 of brass, or other similar material. The blocks are mounted in the slots in any suitable way so as to fill the slots flush with the radial faces of the inductor. The slots do not extend to the periphery of the inductor, so that a continuous ring integral with the rest of the inductor is left, and thus the blocks 26 are securely held from displacement by centrifugal force.

The armature winding is carried in the slots of the laminated rings 22, as illustrated in Fig. 2 of the drawings. One phase of the winding is indicated at 27, while the other phase is indicated at 28. With the arrangement of inductor poles shown in Fig. 2 it will be evident that the electromotive force generated in winding 27 differs 90 degrees in time phase from the electromotive force generated in winding 28. The armature reaction due to leading currents flowing in each phase winding is of the proper time phase for use by the other phase winding as an exciting field, and hence when the machine is loaded upon condensers or connected to a load circuit possessing a preponderance of capacity, the necessary leading current is supplied to the phase windings 27 and 28 and self-excitation is effected.

In Fig. 6 of the drawings, I have shown one way in which the polyphase high frequency alternator may be connected to a single phase load circuit such as the antenna in a system of radio communication for supplying a single phase flow of power which is substantially the sum of the power generated in the different phase windings of the alternator. The phase windings 27 and 28 are connected to independent primary windings 37 and 38 of a transformer suitable for radio frequencies. The secondary windings 47 and 48 of the radio transformer are connected in series with the antenna 30. An adjustable condenser 31 is shunted around the secondary winding 47, while an adjustable inductance 32 is shunted around the secondary winding 48. In Figs. 6, 7, 8, 11 and 12 of the drawings, developed sections of the magnetic inductor are shown, with the magnetic poles represented by P and non-magnetic filling blocks by N.

The vector diagram of Fig. 10 illustrates the phase relations in the system of Fig. 6. The electromotive force generated in the phase winding 27 is represented by $emf_1$. $i_1$ represents the armature current in phase with $emf_1$, and $i_1r_1$, the non-inductive voltage drop in the armature winding. The reactive voltage drop in the armature winding is then represented by $i_1x_1$, at right angles to $i_1$. $E_1$ is then the terminal voltage of the phase winding 27. Similarly, $emf_2$, $i_2$, $i_2r_2$, $i_2x_2$ and $E_2$ represent the induced electromotive force, the armature current in phase with $emf_2$, the non-inductive voltage drop, the reactive voltage drop, and the terminal voltage, respectively, of the phase winding 28. The condenser 31 causes a leading current to flow in the circuit of the phase winding 27 which is represented by $i_1c$, at right angles to the terminal voltage $E_1$. Similarly, the inductance 32 causes a lagging current to flow in the circuit of the phase winding 28, which is represented by $i_2x'_2$ at right angles to the terminal voltage $E_2$. The actual current flowing in the circuit of the winding 27, and thus through the primary winding 37, is the resultant of $I_1$, and $I_1c$, or $I_1$, while the current flowing in the circuit of the winding 28 is the resultant of $i_2$ and $i_2x'_2$, or $I_2$. It will be seen that $I_1$ and $I_2$ are substantially in phase, but are of different magnitudes. The ratio of transformation of the transformer 37—47 should, therefore, be $\frac{I}{I_1}$ where I is the load or antenna current, while the ratio of transformation of the transformer 38—48 should be $\frac{I}{I_2}$.

The capacity of the antenna together with that of the condenser 31 produces the necessary leading current required for the self-exciting operation of the polyphase high frequency alternator. In Fig. 1 of the drawings, I have shown exciting coils 33 mounted in the stator of the alternator for producing an initial excitation, or for producing a partial excitation where the alternator cannot itself furnish all of the magnetization required. It will of course be understood that the use of the exciting coils will depend upon conditions of operation and design, and these coils may, if desired, be omitted.

A single phase high frequency inductor alternator may be self-excited by producing the necessary polyphase effect herein before referred to in the rotor. I have found that a short-circuited winding, in the nature of a squirrel cage winding carried by the inductor can be used for the purposes of self-excitation through armature reaction by a leading current. A squirrel cage winding is usually thought of as having a plurality of bars per pole. However, for the results contemplated by my present invention the squirrel cage winding need have only one conductor per pole, or in other words, a short circuit around each of the poles is sufficient, because the conductors of such a short circuit are always in the position to furnish magnetization to the pole. The currents induced in the short circuit are of twice the frequency of the armature current, as is well known in the theory of single phase induction motors and alternators.

The metallic filling blocks, employed in the inductor of the high frequency alternator of my aforementioned patents to make the radial faces smooth and thus avoid air friction, are in the proper position as a short-circuited winding for the above mentioned purpose. The blocks should be made of copper or an alloy of high conductivity and connected together at their ends. In the rotor construction shown in Patent No. 1,110,029, the metallic filling blocks are connected at their ends by the material of the steel rotor, and a squirrel cage effect may thus be obtained. The effect is obviously increased if a path of lower resistance is provided between the ends of the filling blocks. This can be conveniently done by turning a continuous circumferential groove at the outer and inner ends of the radial slots in the inductor and hammering the material of the filling blocks into these grooves so that a continuous ring of high conductivity is formed at each end of the blocks. Preferably, the slots are slightly flared at the radial faces of the inductor, so that the pole faces are slightly narrower than the corresponding intermediate section of magnetic material. This will be best understood by reference to Figs. 4 and 5 of the drawings. The filling blocks when riveted in place form two continuous rings 34 on each side of the inductor, so that a complete short-circuited winding is formed on each radial face of the inductor. In Figs. 4 and 5 of the drawings, the pole faces are represented at 35 and the filling blocks of copper or the like at 36. The armature winding 40 is carried zig-zag through the slots of the laminated magnetic core of the stator, as shown in Fig. 4 of the drawings. I do not claim in this application the squirrel cage construction above described, since the same is claimed in my copending application Ser. No. 35,711, filed June 22, 1915.

The currents induced in the squirrel cage windings on the radial faces of the inductor produce or assist in producing through armature reaction by a leading armature current, the excitation for the high frequency alternator. In Fig. 7 of the drawings, I have shown such a self-exciting single phase high frequency alternator connected to the antenna 41 of a system of radio communication by a radio transformer 42. An antenna usually possesses a preponderance of capacity and is, accordingly, tuned by inductance. The natural capacity of such an antenna is sufficient to produce the necessary leading current for self-excitation. Where the antenna does not possess a preponderance of capacity, a condenser 43 may be associated therewith, either in series or in shunt, until a satisfactory leading current for self-excitation is obtained.

A high frequency alternator of the type herein contemplated, must be manufactured with considerable accuracy in order to have the relative positions of the rotor poles and armature slots lined up so that the voltages induced in all parts of the armature winding are in phase. In spite of the care that may be taken, it sometimes happens that there is a sufficient error in the mechanical alinement of the machine to make the induced voltage out of phase, and consequently the output of the machine is considerably reduced. One of the features of my present invention has for its purpose to obtain full output from such a mechanically imperfect machine. More generally, my invention, in this connection, aims to provide a novel arrangement of the various circuits of a high frequency alternator, in which voltages of different phase are generated, either by accident or design, for obtaining a single phase flow of power which is the sum of the power generated in the various polyphase circuits of the alternator. In carrying out this feature of my invention, I create by suitable combinations of inductances and capacities, such phase displacements in the various electrical circuits of the alternator as correspond to the phase displacements in the induced voltages due to the error in alinement. While there are numerous ways of applying this principle of my invention, I have illustrated in the accompanying drawings, merely by way of example, two specific systems of connections, which are adapted for high frequency alternators of the type herein described.

In Fig. 9 of the drawings, I have diagrammatically represented by vectors the phases of the voltages induced in sixteen slots of a high frequency inductor alternator of the type herein described. In order to obtain a single phase flow of power which is substantially the sum of the power generated in the various conductors positioned in the sixteen slots of the alternator, I propose to connect the conductors in a plurality of groups, with those conductors whose induced voltages are most nearly of the same time phase included in the same group. The conductors in the sixteen alternator slots are shown in Fig. 8 of the accompanying drawings as arranged in two groups, so that the conductors of each group have generated therein voltages of most nearly the same phase. Thus the conductors represented by the vectors 1' to 8', inclusive, are embraced in one group, and the conductors represented by the vectors 9' to 16', inclusive, are embraced in the second group. The conductors of the high frequency alternator diagrammatically illustrated in Fig. 8, are arranged in independent circuits 1 to 16, inclusive, and have induced therein voltages having a phase relation represented by the vectors 1' to 16', respectively, of Fig. 9. The alternator circuits 1 to 8, inclusive are connected to independent primary windings $p$ to $8p$, respectively of a radio transformer, while the alternator circuits 9 to 16, inclusive, are connected to independent primary windings $9p$ to $16p$, of a second radio transformer. The primary windings $p$ to $8p$, inclusive, are associated with a secondary winding 50, while the primary windings $9p$ to $16p$, inclusive are associated with a secondary winding 51. The secondary windings 50 and 51 are connected to the antenna 52. An adjustable condenser 53, corresponding to the condenser 31 of Fig. 6, is shunted around the secondary winding 51, while an adjustable inductance 54, corresponding to the inductance 32 of Fig. 6, is shunted around the secondary winding 50.

The phase of the resultant current of the independent alternator windings 1 to 8, inclusive, is represented by the vector OA, while the phase of the resultant current of the alternator windings 9 to 16, inclusive, is represented by the vector OB. It will be observed that the alternator of Fig. 8 is in effect connected as a polyphase machine, and may obviously be self-exciting in just the same manner as described in connection with Fig. 6. I have shown the armature winding of the alternator and the primary windings of the radio transformer connected in independent circuits in order to avoid cross currents. It will of course be understood that a polyphase alternator may be designed to have its coils connected as in Fig. 8, or a single phase alternator may be converted into a polyphase alternator, where the design of the single phase machine is such that voltages of different time phase are induced in the conductors in the stator slots.

I have found that a convenient way of changing the phase displacement in the various electrical circuits of the alternator is to put a condenser in series with the particular alternator circuit which is to be shifted. By using more or less capacity the phase displacement can be regulated to any desired degree. Take, for example, as a concrete instance, a 100,000 cycle alternator having the following characteristics:

Electromotive force _____ 130 volts.
Effective resistance of armature winding _____ 1 ohm.
Reactance _____ 6 ohms.
Full load current _____ 30 amperes.

In order to be able to draw full output from the alternator the load should have a leading current so as to neutralize the inductance of the alternator. In order to get full output the current should be in phase with the electromotive force. If this is the case the voltage drop from the effective internal resistance is also in phase with the electromotive force. Thus the generator electromotive force of 130 volts will be reduced to an effective voltage of 100 volts available at the terminals. The full load current of 30 amperes passing over the internal inductance of the alternator generates a voltage of 180. Thus the terminal voltage of the alternator is the vectorial sum of 100 volts in phase and 180 volts in quadrature, which gives a combined or resultant voltage of 205 volts at the terminals. The load circuit must therefore have the characteristics that it can absorb the energy of 3 kw. at 205 volts, at a power factor of 49 per cent. leading current. The phase displacement between the terminal current and the terminal voltage is then 61 degrees. If it is desired to shift the phase of the current, this may be done by a capacity in series with the alternator. If a capacity is selected with a reactance of 6 ohms, this capacity will neutralize the inductive reactance of the alternator winding. Thus the load which is suitable for absorbing the power of the alternator should be non-inductive and should absorb the three kws. at 100 volts. While it can be thus seen that the introduction of a capacity in series with the alternator has shifted the current with reference to the voltage 61 degrees, the terminal voltage has also been reduced in about the ratio of 2 to 1, and the load circuit should therefore be adapted for absorbing the energy at approximately one-half as much voltage in one case as in the other.

Figure 11:
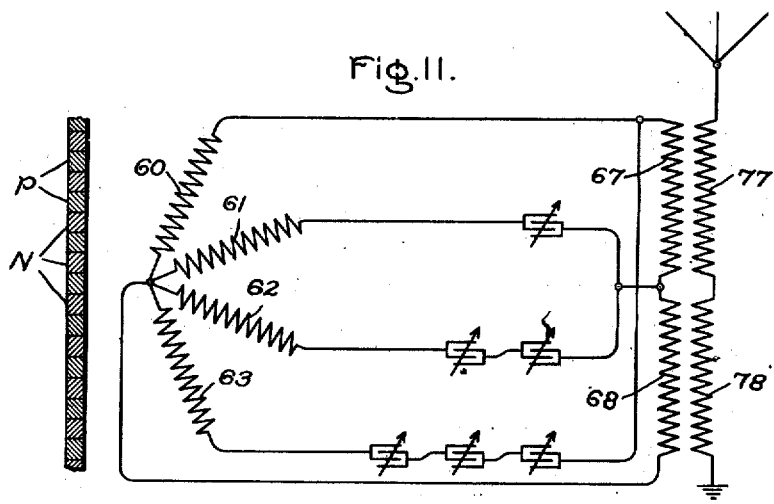
Figure 12:
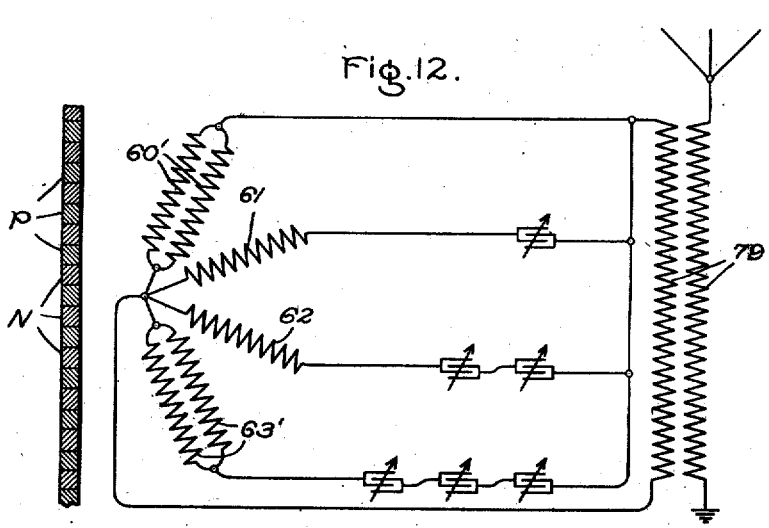
Figure 13:
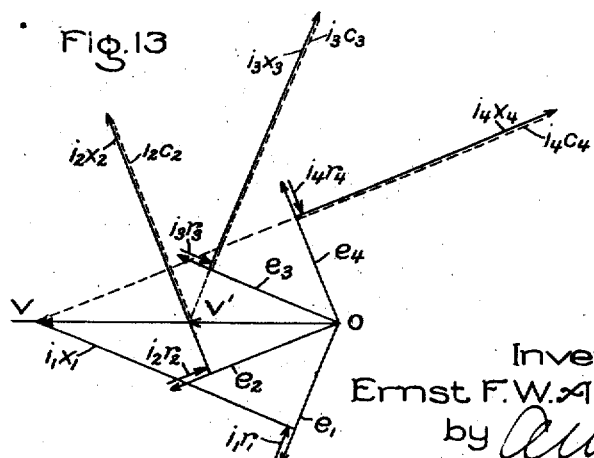

In Figs. 11 and 12 of the drawings, I have diagrammatically illustrated an embodiment of the above principles of my invention in a high frequency alternator connected in a system of radio communication. The various circuits of the alternator of Fig. 11 are represented as feeding energy to the primary coils of two independent radio transformers, the secondaries of which are connected in series with an antenna. Where it is found necessary to correct for mechanical faults, as hereinbefore described, and condensers in series with the various alternator circuits are used for obtaining the necessary phase displacements. It can be seen from the foregoing analysis that the voltages at which the transformer must absorb the energy from the various alternator circuits will be different, depending upon the amount of capacity placed in series to the same. In order to simplify the arrangement of the capacity, as well as the transformer connections, I have in Figs. 11 and 12 of the drawings shown the alternator circuits arranged in four groups. These groups are designated by reference characters 60, 61, 62, and 63, and the phase displacements of the induced voltages of groups 61, 62, and 63 from group 60 are 45, 90, and 135 degrees, respectively. It will be understood that the various armature circuits of the alternator will be placed in the groups to which they come closest in phase displacement, as more particularly described in connection with Figs. 8 and 9. Group 60 has no capacity in series therewith, group 61 has most of its inductance neutralized by capacity so as to give a residual of inductance, group 62 has its inductance more than neutralized so as to give a small residual of capacity, while group 63 is strongly over neutralized so as to give a residual of capacity equal to the original inductance. If this is done in accordance with the vector diagram of Fig. 13, group 60 and 63 will have equal terminal voltages, which are twice as large as the terminal voltages of groups 61 and 62. In the vector diagram of Fig. 13, $e_1$, $e_2$, $e_3$, and $e_4$ represent the induced E. M. F.'s of groups 60, 61, 62 and 63, respectively. $i_1r_1$, $i_2r_2$, $i_3r_3$, and $i_4r_4$ represent the voltage drop in the armature coils of groups 60, 61, 62, and 63, respectively, due to the non-inductive resistance of such coils. $i_1x_1$, $i_2x_2$, $i_3x_3$, and $i_4x_4$ represent the inductive voltage drop in the armature coils of groups 60, 61, 62, and 63, respectively. $i_2c_2$, $i_3c_3$, and $i_4c_4$ represent the capacity voltage associated with groups 61, 62, and 63, respectively. It will thus be seen that OV represents the resultant terminal voltage of groups 60 and 63, while OV' represents the resultant terminal voltage of groups 61 and 62. Since OV is substantially twice as large as OV' it will be necessary that the ratios of transformation of the two radio transformers 67—77 and 68—78 be of the ratio of 2 to 1.

Instead of having different voltages on the radio transformer primaries, it may be more convenient in some cases to employ the same transformer voltage for all circuits and connect two alternator circuits in series for one combination and in parallel for the other combination. Where this latter method is adopted all the alternator circuits can be connected to a common pair of primary terminals on a transformer. If on the other hand, the transformer circuits are conductively separated it is important that they should be very closely interlinked inductively because an imperfect interlinkage is equivalent to the introduction of reactance which would change the phase relations which are worked out with reference to the known reactance of the alternator windings only. For this reason the parallel circuits of the transformer primary will consist of a number of parallel wound strands in the primary coils. In Fig. 12 of the drawings a single radio transformer 79 is shown. Groups 61 and 62 remain the same as in the arrangement of Fig. 11. In groups 60' and 63' the armature circuits are arranged in parallel so as to give half the voltage of the groups 60 and 63. The ratios of transformation of the transformers or transformer connecting the different phase circuits of the armature winding of the alternator to the load circuit will in any case be such that the total power supplied to the load circuit is proportioned among the various armature phase circuits in the ratio of their generative power.

I have explained my invention by illustrating and describing certain specific arrangements of apparatus, but it will be readily understood by those skilled in the art that the invention may be embodied in many other ways than those shown and described. I, accordingly, do not wish to be restricted to the particular arrangements disclosed herein by way of example for the purpose of setting forth my invention in accordance with the patent statutes, but aim in the appended claims to cover all changes and modifications within the spirit and scope of my invention.

What I claim as new, and desire to secure by Letters Patent of the United States, is:

1. A system of distribution comprising in combination a load circuit, a high frequency alternator having a rotatable inductor with a plurality of magnetic poles, a stationary core of laminated magnetic material having slots therein, armature conductors carried in said slots, the spacing of said slots being such that alternating voltages differing in time phase are generated in the conductors therein, the conductors in the stator slots being arranged in a plurality of groups with those conductors whose induced voltages are most nearly of the same time phase included in the same group, and reactive means for so modifying the phase relations of the alternator currents that all of the groups of the armature winding supply to said load circuit alternating currents of substantially the same time phase.

2. A system of distribution comprising in combination a load circuit possessing a preponderance of capacity, a polyphase high frequency alternator adapted for self-excitation through armature reaction by a leading current, means electrically connecting said alternator to said load circuit, and reactive means included in said load circuit for modifying the phase relations of the alternator currents for supplying to said load circuit alternating currents of substantially the same time phase, the capacity of said load circuit including that of said reactive means being such that a leading current is caused to flow in the armature winding of said alternator whereby the armature reaction assists in furnishing the excitation for the alternator.

3. A system of distribution comprising in combination a load circuit possessing a preponderance of capacity, a condenser included in said load circuit, a high frequency inductor alternator adapted for self-excitation through armature reaction by a leading current, means electrically connecting said alternator to said load circuit, the capacity of the load circuit including that of said condenser being such that a leading current is caused to flow in the armature winding of said alternator whereby the armature reaction assists in furnishing the excitation for the alternator.

4. A system of distribution comprising in combination a load circuit possessing a preponderance of capacity, a high frequency inductor alternator adapted for self-excitation through armature reaction by a leading current, and means electrically connecting said alternator to said load circuit, the capacity of said load circuit being such that a leading current is caused to flow in the armature winding of the alternator whereby the armature reaction assists in furnishing the excitation for the alternator.

5. A system of distribution comprising in combination a load circuit, a polyphase high frequency alternator, transformers connecting the phase circuits of said alternator to said load circuit, means for so modifying the phase relation of the alternator currents that all of the phase circuits of the alternator supply to said load circuit alternating currents of substantially the same time phase, the ratios of transformation of said transformers with respect to any alternator phase circuit being determined by the ratio which the current of the proper time phase supplied by such phase circuit bears to the total current supplied to the load circuit.

6. A system of distribution comprising in combination a load circuit, a high frequency alternator having an armature winding arranged in a plurality of sections in which alternating voltages differing in time phase are generated, electrical transforming means connecting the sections of said armature winding to said load circuit, and means for so modifying the phase relations of the alternator currents that all of the sections of the armature winding supply to said load circuit alternating currents of substantially the same time phase, the ratios of transformation of said transforming means with respect to any alternator section being determined by the ratio which the current of the proper time phase supplied by such section bears to the total current supplied to the load circuit.

7. A system of distribution comprising in combination a load circuit possessing a preponderance of capacity, a high frequency alternator having an armature winding arranged in a plurality of sections in which alternating voltages differing in time phase are generated, said alternator being adapted for self-excitation through armature reaction by a leading current, transforming means connecting the sections of said armature winding to said load circuit, and reactive means for so modifying the phase relations of the alternator currents that all of the sections of the armature winding supply to said load circuit alternating currents of substantially the same time phase, the ratios of transformation of said transforming means with respect to any alternator section being determined by the ratio which the current of the proper time phase supplied by such section bears to the total current supplied to the load circuit, and the capacity of said load circuit and reactive means being such that leading currents are caused to flow in the armature sections of said alternator whereby the armature reaction assists in furnishing the excitation for the alternator.

In witness whereof, I have hereunto set my hand this 21st day of June, 1915.

ERNST F. W. ALEXANDERSON.